United States Patent
Veregin et al.

(10) Patent No.: US 12,252,568 B2
(45) Date of Patent: Mar. 18, 2025

(54) SILICONE COPOLYMER SURFACE ADDITIVE

(71) Applicant: Xerox Corporation, Norwalk, CT (US)

(72) Inventors: Richard P. N. Veregin, Mississauga (CA); Kimberly D. Nosella, Ancaster (CA); Raysa Rodriguez Diaz, Burlington (CA); Nan-Xing Hu, Oakville (CA); Majid Kamel, Mississauga (CA); Cuong Vong, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 17/493,966

(22) Filed: Oct. 5, 2021

(65) Prior Publication Data

US 2023/0159683 A1    May 25, 2023

(51) Int. Cl.
| | | |
|---|---|---|
| *G03G 9/087* | (2006.01) | |
| *C08F 212/36* | (2006.01) | |
| *C08F 220/22* | (2006.01) | |
| *C08F 220/34* | (2006.01) | |
| *C08F 230/08* | (2006.01) | |

(52) U.S. Cl.
CPC .......... *C08F 220/22* (2013.01); *C08F 212/36* (2013.01); *C08F 220/34* (2013.01); *C08F 230/08* (2013.01); *G03G 9/08728* (2013.01)

(58) Field of Classification Search
CPC ............. G03G 9/08788; G03G 9/0872; G03G 9/08711; G03G 9/08791
See application file for complete search history.

(56) References Cited

U.S. PATENT DOCUMENTS

| | | | |
|---|---|---|---|
| 3,590,000 A | 6/1971 | Palermiti et al. | |
| 3,847,604 A | 11/1974 | Hagenbach et al. | |
| 4,298,672 A | 11/1981 | Lu | |
| 4,338,390 A | 7/1982 | Lu | |
| 4,533,614 A | 8/1985 | Fukumoto et al. | |
| 4,845,006 A | 7/1989 | Matsubara et al. | |
| 4,863,824 A | 9/1989 | Uchida et al. | |
| 4,863,825 A | 9/1989 | Yoshimoto et al. | |
| 4,917,983 A | 4/1990 | Uchida et al. | |
| 4,927,728 A | 5/1990 | Isoda et al. | |
| 4,931,370 A | 6/1990 | Amaya | |
| 4,933,252 A | 6/1990 | Nishikawa et al. | |
| 4,935,326 A | 6/1990 | Creatura et al. | |
| 4,937,166 A | 6/1990 | Creatura et al. | |
| 4,957,774 A | 9/1990 | Doi et al. | |
| 4,973,539 A | 11/1990 | Sacripante et al. | |
| 4,980,448 A | 12/1990 | Tajiri et al. | |
| 4,981,939 A | 1/1991 | Matsumura et al. | |
| 4,988,794 A | 1/1991 | Kubo et al. | |
| 5,057,596 A | 10/1991 | Kubo et al. | |
| 5,077,170 A | 12/1991 | Tsujihiro | |
| 5,143,809 A | 9/1992 | Kaneko et al. | |
| 5,215,849 A | 6/1993 | Makuta et al. | |
| 5,227,460 A | 7/1993 | Mahabadi et al. | |
| 5,236,629 A | 8/1993 | Mahabadi et al. | |
| 5,290,654 A | 3/1994 | Sacripante et al. | |
| 5,302,486 A | 4/1994 | Patel et al. | |
| 5,330,874 A | 7/1994 | Mahabadi et al. | |
| 5,376,494 A | 12/1994 | Mahabadi et al. | |
| 5,445,910 A * | 8/1995 | Ishikawa ........... | G03G 9/08791 430/108.11 |
| 5,480,756 A | 1/1996 | Mahabadi et al. | |
| 5,500,324 A | 3/1996 | Mahabadi et al. | |
| 5,601,960 A | 2/1997 | Mahabadi et al. | |
| 5,629,121 A | 5/1997 | Nakayama | |
| 5,650,484 A | 7/1997 | Hawkins et al. | |
| 5,750,909 A | 5/1998 | Hawkins et al. | |
| 6,063,827 A | 5/2000 | Sacripante et al. | |
| 6,120,967 A | 9/2000 | Hopper et al. | |
| 6,214,507 B1 | 4/2001 | Sokol et al. | |
| 6,326,119 B1 | 12/2001 | Hollenbaugh, Jr. et al. | |
| 6,358,657 B1 | 3/2002 | Silence et al. | |
| 6,359,105 B1 | 3/2002 | Ianni et al. | |
| 6,592,913 B2 | 7/2003 | Cook et al. | |
| 7,329,476 B2 | 2/2008 | Sacripante et al. | |
| 7,960,082 B2 | 6/2011 | Aziz et al. | |
| 8,663,886 B2 | 3/2014 | Vanbesien et al. | |
| 10,358,557 B1 | 7/2019 | Veregin et al. | |
| 10,725,394 B1 * | 7/2020 | Veregin ............. | G03G 9/09321 |
| 2006/0216626 A1 | 9/2006 | Sacripante et al. | |
| 2008/0107990 A1 | 5/2008 | Field et al. | |
| 2008/0236446 A1 | 10/2008 | Zhou et al. | |
| 2009/0047593 A1 | 2/2009 | Mizutani et al. | |
| 2020/0308328 A1 | 10/2020 | Veregin et al. | |
| 2022/0128920 A1 * | 4/2022 | Shirakawa ........ | C08F 230/085 |

FOREIGN PATENT DOCUMENTS

JP    64-33562    *  2/1989  ............... G03G 9/10

OTHER PUBLICATIONS

Translation of JP 64-33562.*
Richard Philip Nelson Veregin, et al., U.S. Appl. No. 17/086,516, filed Nov. 21, 2020, "Toner Compositions And Additives," not yet published.
Richard Philip Nelson Veregin, et al., U.S. Appl. No. 17/213,295, filed Mar. 26, 2021, "Toner Compositions And Additives," not yet published.

* cited by examiner

*Primary Examiner* — Peter L Vajda
(74) *Attorney, Agent, or Firm* — Marylou J. Lavoie, Esq.

(57) ABSTRACT

An organic polymeric particle including an optional first monomer comprising a hydrophobic monomer; a second monomer comprising two or more vinyl groups; an optional third monomer comprising an amine; and a vinyl siloxane polymerizable monomer.

19 Claims, No Drawings

SILICONE COPOLYMER SURFACE ADDITIVE

BACKGROUND

Disclosed herein is an organic silicone copolymer latex surface additive providing improved photoreceptor cleaning. Particularly disclosed is an organic polymeric particle comprising: an optional first monomer comprising a hydrophobic monomer; a second monomer comprising two or more vinyl groups; an optional third monomer comprising an amine; and a vinyl siloxane polymerizable monomer.

Further disclosed herein is a toner composition, in embodiments, an emulsion aggregation toner composition, comprising: at least one resin, an optional colorant, an optional wax, and an organic polymeric particle toner additive on at least a portion of an external surface of the toner particles, the particulate organic polymeric particle toner additive comprising: an optional first monomer comprising a hydrophobic monomer; a second monomer comprising two or more vinyl groups; an optional third monomer comprising an amine; and a vinyl siloxane polymerizable monomer.

Further disclosed is a developer comprising: a toner composition, and a toner carrier; wherein the toner composition comprises: toner particles comprising at least one resin, an optional colorant, an optional wax, and an organic polymeric particle toner additive on at least a portion of an external surface of the toner particles, the organic polymeric particle toner additive comprising: an optional first monomer comprising a hydrophobic monomer; a second monomer comprising two or more vinyl groups; an optional third monomer comprising an amine; and a vinyl siloxane polymerizable monomer.

Electrophotographic printing utilizes toner particles which may be produced by a variety of processes. One such process includes an emulsion aggregation ("EA") process that forms toner particles in which surfactants are used in forming a latex emulsion. See, for example, U.S. Pat. No. 6,120,967, the disclosure of which is hereby incorporated by reference in its entirety, as one example of such a process.

Combinations of amorphous and crystalline polyesters may be used in the EA process. This resin combination may provide toners with high gloss and relatively low-melting point characteristics (sometimes referred to as low-melt, ultra-low melt, or ULM), which allows for more energy efficient and faster printing.

The use of additives with EA toner particles may be important in realizing optimal toner performance, such as, for providing improved charging characteristics, improved flow properties, and the like. Poor fusing creates problems in paper adhesion and print performance. Poor toner flow cohesion can affect toner dispense, which creates problems in gravity-fed cartridges, and leads to deletions on paper. In addition, the use of additives with EA toner particles may also mitigate bias charge roller (BCR) contamination.

U.S. Pat. No. 8,663,886, which is hereby incorporated by reference herein in its entirety, describes in the Abstract thereof polymeric additives for use with toner particles. The polymeric additive includes a copolymer possessing at least one monomer having a high carbon to oxygen ration, a monomer having more than one vinyl group, and at least one amine-functional monomer.

U.S. Pat. No. 10,358,557, which is hereby incorporated by reference herein in its entirety, describes in the Abstract thereof a polymeric composition for use with toner particles. The polymeric composition includes a silicone-polyether copolymer and a polymeric additive, wherein the silicone-polyether copolymer comprises a polysiloxane unit and a polyether unit, and the polymeric additive comprises a copolymer possessing at least one monomer having a high carbon to oxygen ratio, a monomer having more than one vinyl group, and at least one amine-functional monomer. In U.S. Pat. No. 10,358,557, it is described that one can use a water dispersible or water soluble (polydimethylsiloxane) PDMS containing polymer which could be applied to the surface of an organic additive in the aqueous phase prior to spray drying. In U.S. Pat. No. 10,358,557, an organic additive is surface treated with a water-soluble or water-dispersible siloxane copolymer, such as a silicone polyether, also known as a dimethicone polyol. The polymeric organic additive latex is prepared by emulsion polymerization in water, then the surface treatment is readily applied by dissolving or dispersing the silicone polyether in the latex, following by spray drying. The treated and dried latex is then blended on the toner, and can provide improved performance compared to the untreated polymeric additive, such as to improve toner flow, and bias charge roller (BCR), photoreceptor, and foam roller contamination. However, this approach requires surface treating the organic additive. Further, this approach may lead to poor spots performance, worse than if no surface treatment is applied to the organic additive.

U.S. patent application Ser. No. 17/086,516, filed Nov. 21, 2020, which is hereby incorporated by reference herein in its entirety, describes a highly crosslinked emulsion polymerized organic polymer latex based toner additive comprising a fluorinated monomer that can provide very negative charging with good RH sensitivity and thus could be used as a charge control agent. This additive could potentially be used to replace medium sized silica external additives.

There is a continual need for improving the additives used in toners, including formation of EA toners, especially low-melt EA toners to improve toner flow and reduce BCR contamination. There is also a continual need to develop lower cost EA toners.

Sol-gel silica is often used as an external toner additive in emulsion aggregation toner products. While sol-gel silica external additives perform well for many functions including charge control, high transfer efficiency, and stable aging performance, it is very expensive, contributing most of the additive cost, such as about 35 percent of the total.

Currently available toner compositions and processes are suitable for their intended purposes. However a need remains for a replacement for sol-gel silica external surface additives that provide needed functionality and that do so at a reduced costs over sol-gel silica. Further, a need remains for an external surface additive that can be used with color toners which use a BCR charging system, and further which can eliminate the elevating spotting that can be seen which is believed due to a cleaning issue. Thus, a need remains for an improved, cost effective external surface additive that can replace sol-gel silica and that improves cleaning. There is further a need for an improved external surface additive for emulsion aggregation toner based printing products that provides PDMS as a lubricant for photoreceptor cleaning. There is further a need for such an additive that can replace silica and titania.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an organic polymeric particle comprising: an optional first monomer comprising a hydrophobic monomer; a second monomer comprising two or more vinyl groups; an optional third monomer comprising an amine; and a vinyl siloxane polymerizable monomer.

Also described is a toner composition comprising: at least one resin, an optional colorant, an optional wax, and an organic polymeric particle toner additive on at least a portion of an external surface of the toner particles, the particulate organic polymeric particle toner additive comprising: an optional first monomer comprising a hydrophobic monomer; a second monomer comprising two or more vinyl groups; an optional third monomer comprising an amine; and a vinyl siloxane polymerizable monomer.

Also described is a developer comprising: a toner composition, and a toner carrier; wherein the toner composition comprises: toner particles comprising at least one resin, an optional colorant, an optional wax, and an organic polymeric particle toner additive on at least a portion of an external surface of the toner particles, the organic polymeric particle toner additive comprising: an optional first monomer comprising a hydrophobic monomer; a second monomer comprising two or more vinyl groups; an optional third monomer comprising an amine; and a vinyl siloxane polymerizable monomer.

DETAILED DESCRIPTION

The present disclosure provides an organic crosslinked polymer particle containing a siloxane vinyl monomer and a multifunctional vinyl crosslinker. Since the siloxane is a monomer, it is copolymerized into the organic additive particle. This organic polymeric additive can be used for any suitable or desired purpose, including as a surface additive, in embodiments, as a surface additive for toners, in particular, as a surface additive for emulsion aggregation toners.

The siloxane is chemically bonded as part of the organic additive resin, not just physically adsorbed. This dramatically improves the color toner spots issued sometimes seen with organic surface additives used to replace sol-gel silica, and this improvement is seen as compared to organic additives having just physically adsorbed PDMS oil which can have spots performance much worse than organic additives without PDMS oil. Further, the present organic polymeric particle provides an improvement in blocking compared to prior organic additives such as organic polymeric additives used as sol-gel silica replacements.

In embodiments, an organic polymeric particle is provided comprising: an optional first monomer comprising a hydrophobic monomer; a second monomer comprising two or more vinyl groups; an optional third monomer comprising an amine; and a vinyl siloxane polymerizable monomer.

The resulting polymeric toner additive particle may be used as an additive with toner compositions, providing the resulting toner with enhanced sensitivity to relative humidity and charge stability. The polymeric toner additive particles of the present disclosure may also provide toner particles with a wide range of properties including hydrophobicity and charge control, depending on the monomers used in the formation of the polymers. The polymeric toner additive particles also provide good toner powder flow, and toner thermal blocking stability that maintains good toner flow and charge after exposure to high temperature and humidity, such as occurs in storage or in running the printer for long print runs in hot humid conditions. The polymeric toner additive particles also provide stable toner development from the developer to the photoreceptor, and transfer from the photoreceptor to the imaging substrate, or in imaging systems with an intermediate transfer media, from the photoreceptor to the intermediate transfer media, and from the intermediate transfer media to the imaging substrate.

The resulting polymeric toner additive particle may be used as a replacement for sol-gel silica external surface additives providing needed functionality at a reduced cost over sol-gel silica. The polymeric toner additive can be used as an external surface additive that can be used with color toners which use a (bias charge roller) BCR charging system, and further can eliminate the elevating spotting that can be seen with previous additives which is believed due to a cleaning issue. Thus, the present polymeric toner additive provides an improved, cost effective external surface additive that can replace sol-gel silica and improves cleaning. The present polymeric toner additive further provides an improved external surface additive for emulsion aggregation toner based printing products that provides PDMS as a lubricant for photoreceptor cleaning. The present polymeric toner additive can replace silica and titania.

The organic polymeric additive, also termed herein an organic polymeric particle, a polymeric toner additive or a copolymer or copolymer toner additive, in embodiments, is a latex formed using emulsion polymerization. The latex includes an optional first monomer comprising a hydrophobic monomer, which is, in embodiments, a monomer with a high carbon to oxygen (C/O) ratio combined with a monomer possessing two or more vinyl groups, combined with an optional third monomer containing an amine functionality, combined with a vinyl siloxane polymerizable monomer. The aqueous latex is then dried and can be used for any suitable or desired application, in embodiments, as a toner surface additive in place of, or in conjunction with, other toner additives. The use of a high C/O ratio monomer provides good relative humidity (RH) stability, and the use of the amine functional monomer provides desirable charge control for the resulting toner composition. The use of a monomer possessing two or more vinyl groups, sometimes referred to herein, in embodiments, as a crosslinking monomer or a crosslinking vinyl monomer, provides a crosslinked property to the polymer, thereby providing mechanical robustness required in the developer housing. Incorporating a vinyl siloxane monomer into the organic polymeric particle provides improvements including improved photoreceptor cleaning and reduced spots.

As used herein, a polymer or co-polymer is defined by the monomer(s) from which a polymer is made. Thus, for example, while in a polymer made using an acrylate monomer as a monomer reagent, an acrylate moiety per se no longer exists because of the polymerization reaction, as used herein, that polymer is said to comprise the acrylate monomer. Thus, an organic polymeric additive made by a process disclosed herein can be prepared, for example, by the polymerization of monomers including cyclohexyl methacrylate, divinyl benzene, and dimethylaminoethylmethacrylate. The resulting organic polymeric additive can be said to comprise cyclohexyl methacrylate as that monomer was used to make the organic polymeric additive; can be said to be composed of or as comprising divinyl benzene as divinyl benzene is a monomer reagent of that polymer; and so on. Hence, a polymer is defined herein based on one or more of the component monomer reagents, which provides a means to name the organic polymeric additives herein.

As noted above, the polymeric additive may be in a latex. In embodiments, a latex copolymer utilized as the polymeric surface additive may include a first monomer having a high C/O ratio, such as an acrylate or a methacrylate. In embodiments, the first monomer comprising a hydrophobic monomer is present, and the first monomer comprises a non-fluorinated hydrophobic monomer having a high carbon to oxygen ratio of from about 3 to about 8, or a fluorinated monomer. The C/O ratio of such a monomer may be from about 3 to about 8, in embodiments, from about 4 to about 7, or from about 5 to about 6. In embodiments, the C/O ratio of such a monomer may be 3 or greater, in embodiments 4 or greater, in embodiments 5 or greater. In embodiments, the hydrophobic monomer can be a fluorinated monomer.

In embodiments, the monomer having a high C/O ratio may be an aliphatic cycloacrylate. Suitable aliphatic cycloacrylates which may be utilized in forming the polymer additive include, for example, cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, combinations thereof, and the like. In other embodiments the hydrophobic ethylenically unsaturated polymerizable monomer includes linear or branched acrylates, such as n-butyl (meth)acrylate, isobutyl (meth)acrylate, combinations thereof, and the like.

In embodiments, the first monomer comprising a hydrophobic monomer is present and comprises an acrylate, a methacrylate, or a cyclohexylmethacrylate. In embodiments, the first monomer comprising a hydrophobic monomer comprises an aliphatic cycloacrylate is selected from a member of the group consisting of cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, and combinations thereof.

In embodiments, the first monomer comprises a fluorinated acrylate. The hydrophobic monomer may include fluorinated monomers, for example, 2,4,6-fluorophenyl acrylate, pentafluorophenyl acrylate, hexafluoro-iso-propyl methacrylate, 1H,1H,3H-hexafluorobutyl methacrylate, 2,2,2-trifluoroethyl acrylate, 2,2,2-trifluoroethyl methacrylate, 1H, 1H,2H-heptadecafluorodecyl methacrylate (HDFDMA), 1H, 1H,5H-octafluoropentyl methacrylate, 2,2,3,3,4,4,5,5,6,6,7,7-dodecafluoroheptyl acrylate 3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,10-heptadecafluorodecyl methacrylate, 2,2,3,3,4,4,4-heptafluorobutyl acrylate, 2,2,3,3,4,4,4-heptafluorobutyl methacrylate, 2,2,3,4,4,4-hexafluorobutyl acrylate, 2,2,3,4,4,4-hexafluorobutyl methacrylate, 1,1,1,3,3,3-hexafluoroisopropyl acrylate, 1,1,1,3,3,3-hexafluoroisopropyl methacrylate, 2,2,3,3,4,4,5,5-octafluoropentyl methacrylate, 2,2,3,3,3-pentafluoropropyl acrylate, 2,2,3,3,3-pentafluoropropyl methacrylate, 1H, 1H,2H,2H-perfluorodecyl acrylate, 2,2,3,3-tetrafluoropropyl methacrylate, 3,3,4,4,5,5,6,6,7,7,8,8,8-tridecafluorooctyl acrylate, 3,3,4,4,5,5,6,6,7,7,8,8,8-tridecafluorooctyl methacrylate, 2,2,2-trifluoroethyl methacrylate, 2-[(1',1',1'-trifluoro-2'-(trifluoromethyl)-2'-hydroxy)propyl]-3-norbornyl methacrylate, perfluorocyclohexyl (meth)acrylate and any combinations thereof and the like. In embodiments, the first monomer comprises trifluoroethylmethacrylate.

The organic polymeric particle additive may be comprised of any combination of the above described hydrophobic non-crosslinkable monomers, fluorinated and non-fluorinated, in any relative proportion. The total amount of hydrophobic non-crosslinkable monomers incorporated in the total monomer composition may be from about 75 weight percent to about 85 weight percent, from about 70 weight percent to about 90 weight percent from about to about 50 weight percent to about 92 weight percent.

In embodiments, the first monomer comprising a hydrophobic monomer having a high carbon to oxygen ratio, in embodiments, a cycloacrylate, may be present in the copolymer utilized as a polymeric additive in any suitable or desired amount. In embodiments, the cycloacrylate may be present in the copolymer in an amount of from about 40 percent by weight of the copolymer to about 99.4 percent by weight of the copolymer, or from about 50 percent by weight of the copolymer to about 95 percent by weight of the copolymer, or from about 60 percent by weight of the copolymer to about 95 percent by weight of the copolymer. In embodiments, the first monomer is present in the copolymer in an amount of from about 40 percent by weight to about 90 percent by weight, based on the weight of the copolymer, or from about 45 percent by weight to about 90 percent by weight, based on the weight of the copolymer.

The organic polymeric particle additive also includes a second monomer, wherein the second monomer comprises a crosslinking monomer, in embodiments, the second monomer comprises a crosslinking monomer possessing vinyl groups, in certain embodiments, two or more vinyl groups.

Suitable monomers having vinyl groups for use as the crosslinking vinyl containing monomer include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2,-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, divinyl ether, combinations thereof, and the like. In a specific embodiment, the second monomer is divinyl benzene.

In embodiments, the second monomer/crosslinking agent may be fluorinated. Suitable fluorinated crosslinking agents include fluorinated divinyl crosslinking agents, such as 1,8-divinyl perfluoro (octane), 1,6-divinyl perfluoro (hexane) and 1,4-divinyl perfluoro (butane) and perfluorocyclohexyl (meth)acrylate, combinations thereof, and the like.

In embodiments, the monomer possessing two or more vinyl groups is present at from 8 weight percent to 40 weight percent of the polymeric resin (that is, the organic polymeric particle), from about 8 weight percent to about 30 weight percent of the polymeric resin, or from about 10 weight percent to about 20 weight percent of the polymeric resin.

In embodiments, the organic polymeric particle toner additive herein comprises a second monomer which results in the copolymer organic polymeric particle toner additive being a highly crosslinked copolymer. In embodiments, the second monomer comprising two or more vinyl groups is present in the copolymer in an amount of greater than about 8 percent by weight to about 60 percent by weight, based upon the weight of the copolymer, or greater than about 10 percent by weight to about 60 percent by weight, based upon the weight of the copolymer, or greater than about 20 percent by weight to about 60 percent by weight, based upon the weight of the copolymer, or greater than about 30 percent by weight to about 60 percent by weight, based upon the weight of the copolymer. In certain embodiments, the second monomer is present in the copolymer in an amount of greater than about 40 percent by weight to about 60 percent by weight, or greater than about 45 percent by weight to about 60 percent by weight, based on the weight of the copolymer.

For some commercially available monomers the monomer purity is relatively low. For example, commercial DVB-55 divinylbenzene contains about 55 weight percent divinylbenzene and about 45 weight percent ethylvinylbenzene. Ethylvinylbenzene does not contain two vinyl groups to promote crosslinking, but it does undergo copolymerization with an ethylenically unsaturated monomer. Thus, as an example, for a 55% purity of commercial divinyl benzene, the weight percent divinyl benzene in the final copolymer composition is 0.55x weight percent of divinyl benzene that is added.

An important parameter for the cross-linked polymeric particles is the number of cross-links created in the polymer particles. The number of cross-links per mole of total polymer for a divalent crosslinker is equal to the weight percent crosslinker in the polymer divided by the molecular weight of the crosslinker as the numerator, divided by the denominator, which is the sum of weight percent of each monomer divided by the molecular weight of that monomer. The result is the moles of cross-linking per mole of monomer units, or equivalently, the number of cross-links per monomer unit. For a trivalent crosslinker, the crosslink density is 2-fold higher, as there are two cross-links for every crosslink unit, and for a tetravalent crosslinker, the crosslink density would be 3-fold this value.

Cross-link density is a critical property as this is an important factor to control the rigidity of the polymer particle, its resistance to deformation. In U.S. Patent Application Publication 2020/0308328, which is hereby incorporated by reference herein in its entirety, it was shown that at least 20% of DVB-55 divinylbenzene cross-linker needed to be added so that the cross-linked polymeric particles remained spherical over 1 hours of mixing with developer, which simulated the mixing that toner would see in a printer. If the cross-linked polymer particles flatten then they do not retain their function as a function of mixing, leading to poor performance in the printer. The minimum amount of 20 weight percent of DVB-55 results in a cross-link density, calculated as shown above, of 0.15 cross-links per monomer unit. At 15 weight percent of DVB-55 added, the cross-linked density was 0.11 cross-links per monomer unit, but was insufficient to maintain spherical particles for an hour of aggressive mixing. On the other hand, at 25 weight percent of DVB-55 added, the cross-linked density was 0.19 cross-links per monomer unit, which was sufficient to maintain spherical crosslinked particles for at least 2 hours.

The organic polymeric particle herein optionally further comprises a third monomer comprising an amine functionality. Monomers possessing an amine functionality may be derived from acrylates, methacrylates, combinations thereof, and the like. In embodiments, suitable amine-functional monomers include dimethylaminoethyl methacrylate (DMAEMA), diethylaminoethyl methacrylate, dipropylaminoethyl methacrylate, diisopropylaminoethyl methacrylate, dibutylaminoethyl methacrylate, combinations thereof, and the like.

In embodiments, the organic polymeric particle herein does not contain the third monomer. In other embodiments, the copolymer herein contains the third monomer comprising an amine-functional monomer. The amine-functional monomer, if present, may be present in the copolymer in an amount of from about 0.1 percent by weight of the copolymer to about 40 percent by weight of the copolymer, or from about 0.5 percent by weight of the copolymer to about 5 percent by weight of the copolymer, or from about 0.5 percent by weight of the copolymer to about 1.5 percent by weight of the copolymer.

In embodiments, the organic polymeric particle additive comprises cyclohexyl methacrylate as a hydrophobic monomer and divinyl benzene as a cross-linkable monomer. In certain embodiments, the copolymer additive comprises cyclohexyl methacrylate as a hydrophobic monomer, divinyl benzene as a cross-linkable monomer, and dimethylaminoethyl methacrylate as a nitrogen-containing monomer.

The organic polymeric particle contains a vinyl siloxane polymerizable monomer. In embodiments, the vinyl siloxane has a vinyl content of from about 0.02 to about 3 millimoles/gram. In embodiments, the vinyl siloxane has a viscosity of from about 10 centistokes (cSt) to about 3,000 cSt. In embodiments, the vinyl siloxane has a vinyl content of from about 0.02 to about 3 millimoles/gram and a viscosity of from about 10 centistokes (cSt) to about 3,000 cSt.

In embodiments, the vinyl siloxane is vinyl terminated silicone-polyether. In embodiments, the vinyl siloxane polymerizable monomer is poly(dimethylsiloxane). In embodiments, the vinyl siloxane polymerizable monomer is vinylmethyl-dimethylpolysiloxane.

Methods for forming the organic polymeric particle surface additive are within the purview of those skilled in the art and include, in embodiments, emulsion polymerization of the monomers utilized to form the polymeric additive.

In the polymerization process, the reactants may be added to a suitable reactor, such as a mixing vessel. The appropriate amount of starting materials may be optionally dissolved in a solvent, an optional initiator may be added to the solution, and contacted with at least one surfactant to form an emulsion. A copolymer may be formed in the emulsion (latex), which may then be recovered and used as the polymeric additive for a toner composition.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, the latex for forming the polymeric additive may be prepared in an aqueous phase containing a surfactant or co-surfactant, optionally under an inert gas such as nitrogen. Surfactants which may be utilized with the resin to form a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™ NEO- GEN SC™ obtained from Daiichi Kogyo Seiyaku Co., Ltd., combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quartenized polyoxyethylalkylamines, dodecylbenzyl triethyl ammonium chloride, MIRAPOLR and ALKAQUATR available from Alkaril Chemical Company, SANISOL (benzalkonium chloride), available from Kao Chemicals, combinations thereof, and the like. In embodiments a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxymethyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

In embodiments initiators may be added for formation of the latex utilized in formation of the polymeric additive. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2,-azobis propanenitrile, VAZO 88™, 2-2'-azobis isobutyramide dehydrate, and combinations thereof. Other water-soluble initiators which may be utilized include azoamidine compounds, for example 2,2,-azobis(2-methyl-N-phenylpropionamidine) dihydrochloride, 2,2'-azobis[N-(4-chlorophenyl)-2-methylpropionamidine]di-hydrochloride, 2,2',-azobis[N-(4-hydroxyphenyl)-2-methyl-propionamidine]dihydrochloride, 2,2',-azobis[N-(4-amino-phenyl)-2-methylpropionamidine] tetrahydrochloride, 2,2',-azobis[2-methyl-N(phenylmethyl) propionamidine]dihydrochloride, 2,2,-azobis[2-methyl-N-2-propenylpropionamidinedihydrochloride, 2,2',-azobis[N-(2-hydroxy-ethyl)2-methylpropionamidine]dihydrochloride, 2,2-azobis[2 (5-methyl-2-imidazolin-2-yl)propane] dihydrochloride, 2,2,-azobis[2-(2-imidazolin-2-yl)propane] dihydrochloride, 2,2'-azobis[2-(4,5,6,7-tetrahydro-1H-1,3-diazepin-2-yl)propane]dihydrochloride, 2,2,-azobis[2-(3,4, 5,6-tetrahydropyrimidin-2-yl)propane]dihydrochloride, 2,2',-azobis[2-(5-hydroxy-3,4,5,6-tetrahydropyrimidin-2-yl) propane]dihydrochloride, 2,2',-azobis {2-[1-(2-hydroxyethyl)-2-imidazolin-2-yl]propane}dihydrochloride, combinations thereof, and the like.

Initiators can be added in suitable amounts, such as from about 0.1 to about 8 weight percent, or from about 0.2 to about 5 weight percent, of the monomers.

In forming the emulsions, the starting materials, surfactant, optional solvent, and optional initiator may be combined utilizing any means within the purview of those skilled in the art. In embodiments, the reaction mixture may be mixed for from about 1 minute to about 72 hours, in embodiments from about 4 hours to about 24 hours, while keeping the temperature at from about 10° C. to about 100° C., or from about 20° C. to about 90° C., or from about 45° C. to about 75° C.

Those skilled in the art will recognize that optimization of reaction conditions, temperature, and initiator loading can be varied to generate polymers of various molecular weights, and that structurally related starting materials may be polymerized using comparable techniques.

The resulting latex, possessing the polymeric additive of the present disclosure, may have a C/O ratio of from about 3 to about 8, in embodiments from about 4 to about 7.

The resulting latex, possessing the polymeric additive of the present disclosure, may be applied to toner particles utilizing any means within the purview of one skilled in the art. In embodiments, the toner particles may be dipped in or sprayed with the latex including the polymeric additive, thus becoming coated therewith, and the coated particles may then be dried to leave the polymeric coating thereon.

In other embodiments, once the copolymer utilized as the additive for a toner has been formed, it may be recovered from the latex by any technique within the purview of those skilled in the art, including filtration, drying, centrifugation, spray draying, combinations thereof, and the like.

In embodiments, once obtained, the copolymer utilized as the additive for a toner may be dried to powder form by any method within the purview of those skilled in the art, including, for example, freeze drying, optionally in a vacuum, spray drying, combinations thereof, and the like. The dried polymeric additive of the present disclosure may then be applied to toner particles utilizing any means within the purview of those skilled in the art including, but not limited to, mechanical impaction and/or electrostatic attraction.

Particles of the present organic polymeric additive may have an average or medium particle size (d50) of from about 70 nanometers to about 250 nanometers in diameter, or from about 80 nanometers to about 200 nanometers in diameter, or from about 80 to about 115 nanometers. Advantageously, the teachings of the present disclosure render it easier to arrive at the desired particle size, in embodiments, a copolymer size as described herein.

Average particle size measurements of polymer toner additives can be determined by dynamic light scattering using a Nanotrac252 instrument (from Microtrac, Inc.).

As used herein, the term "average particle size" refers to a diameter at which 50% of the sample (on a volume basis unless otherwise specified) is comprised of particles having a diameter less than said diameter value. Average particle size may also be referred to as the "D50."

The copolymers utilized as the polymeric additive, in embodiments, are not soluble in solvents such as tetrahydrofuran (THF) due to their highly cross-linked nature. Thus, it is not possible to measure a number average molecular weight (Mn) or a weight average molecular weight (Mw), as measured by gel permeation chromatography (GPC).

The organic polymeric particle herein may be used as an additive for any suitable or desired application. In embodiments, the organic polymeric particle herein is used as a toner additive and may be combined with toner particles so that the organic polymeric particle is present in an amount of from about 0.1 percent to about 5 percent by weight, or from about 0.2 percent to about 4 percent by weight, or from about 0.5 percent to about 1.5 percent by weight, based upon the weight of the toner particles. In embodiments, the polymeric composition may cover from about 5 percent to about 100 percent, or from about 10 percent to about 100 percent, or from about 20 percent to about 50 percent of the surface area of the toner particles.

The organic polymeric particle additives thus produced may be combined with toner resins, optionally possessing colorants, to form a toner of the present disclosure.

Any toner resin may be utilized in forming a toner of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various melting points of, for example, from about 30° C. to about 120° C., in embodiments from about 75° C. to about 115° C., in embodiments from about 100° C. to about 110° C., or in embodiments from about 104° C. to about 108° C. As used herein, the low molecular weight amorphous polyester resin has, for example, a number average molecular weight (Mn), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight (Mw) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution (Mw/Mn) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly (co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

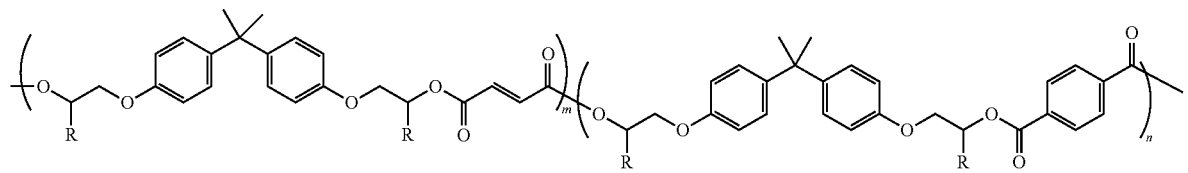

wherein R may be hydrogen or a methyl group, m and n represent random units of the copolymer, m may be from about 2 to 10, and n may be from about 2 to 10. Examples of such resins and processes for their production include those disclosed in U.S. Pat. No. 6,063,827, the disclosure of which is hereby incorporated by reference herein in its entirety.

An example of a linear propoxylated bisphenol A fumarate resin which may be utilized as a latex resin is available under the trade name SPARII™ from Resana S/A Industrias Quimicas, Sao Paulo Brazil. Other suitable linear resins include those disclosed in U.S. Pat. Nos. 4,533,614, 4,957,774, and 4,533,614, each of which is incorporated by reference herein in its entirety, which can be linear polyester resins including terephthalic acid, dodecylsuccinic acid, trimellitic acid, fumaric acid and alkyloxylated bisphenol A, such as, for example, bisphenol-A ethylene oxide adducts and bisphenol-A propylene oxide adducts. Other propoxylated bisphenol A terephthalate resins that may be utilized and are commercially available include GTU-FC115, commercially available from Kao Corporation, Japan, and the like.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-isophthalate, polypropyleneisophthalate, polybutylene-isophthalate, polypentylene-isophthalate, polyhexalene-isophthalate, polyheptadene-isophthalate, polyoctalene-isophthalate, polyethylene-sebacate, polypropylene sebacate, polybutylene-sebacate, polypropylene-adipate, polybutylene-adipate, polyheptadene-adipate, polyhexalene-adipate, polypropylene-glutarate, polyethylene-glutarate, polyhexalene-glutarate, polypentylene-glutarate, polyethylene-pimelate, polyoctalene-glutarate polypentylene-pimelate, polybutylene-pimelate, polyethylene-adipate, polypentylene-adipate, polyoctalene-adipate, polybutylene-glutarate, polyheptadene-glutarate, polypropylene-pimelate, polyhexalene-pimelate, polyheptadene-pimelate, poly(ethoxylated bisphenol A-fumarate), poly(ethoxylated bisphenol A-succinate), poly(ethoxylated bisphenol A-adipate), poly(ethoxylated bisphenol A-glutarate), poly(ethoxylated bisphenol A-terephthalate), poly(ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly(propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL® (Reichhold Inc.), ARAKOTE (Ciba-Geigy Corporation), HETRON™ (Ashland Chemical), PARAPLEX® (Rohm & Haas), POLYLITER (Reichhold Inc.), PLASTHALL® (Rohm & Haas), CELANEX® (Celanese Corporation), RYNITER (Dupont™), STYPOLR (Polynt Composites, Inc.), and combinations thereof. The resins can also be functionalized, such as carboxylated, sulfonated, or the like, and particularly such as sodio sulfonated, if desired.

The low molecular weight linear amorphous polyester resins are generally prepared by the polycondensation of an organic diol, a diacid or diester, and a polycondensation catalyst. The low molecular weight amorphous resin is generally present in the toner composition in various suitable amounts, such as from about 60 to about 90 weight percent, in embodiments from about 50 to about 65 weight percent, of the toner or of the solids.

Examples of organic diols selected for the preparation of low molecular weight resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of diacid or diesters selected for the preparation of the low molecular weight amorphous polyester include dicarboxylic acids or diesters such as terephthalic acid, phthalic acid, isophthalic acid, fumaric acid, maleic acid, itaconic acid, succinic acid, succinic anhydride, dodecylsuccinic acid, dodecylsuccinic anhydride, dodecenylsuccinic acid, dodecenylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, dimethyl dodecenylsuccinate, and mixtures thereof. The organic diacid or diester is selected, for example, in an amount of from about 45 to about 52 mole percent of the resin.

Examples of suitable polycondensation catalysts for either the low molecular weight amorphous polyester resin or the crystalline resin (described below) include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl) methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

The resulting unsaturated polyesters are reactive (for example, crosslinkable) on two fronts: (i) unsaturation sites (double bonds) along the polyester chain, and (ii) functional groups such as carboxyl, hydroxy, and the like, groups amenable to acid-base reactions. In embodiments, unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature of from about 30° C. to about 80° C., in embodiments from about 35° C. to about 70° C. In further embodiments, the combined amorphous resins may have a melt viscosity of from about 10 to about 1,000,000 Pa*S at about 130° C., in embodiments from about 50 to about 100,000 Pa*S.

The amount of the low molecular weight amorphous polyester resin in a toner particle of the present disclosure, whether in any core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin. As used herein, "crystalline" refers to a polyester with a three dimensional order. "Semicrystalline resins" as used herein refers to resins with a crystalline percentage of, for example, from about 10 to about 90%, in embodiments from about 12 to about 70%. Further, as used hereinafter, "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50° C. to about 90° C. The crystalline resins may have, for example, a number average molecular weight (Mn), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The weight average molecular weight (Mw) of the resin is 50,000 or less, for example, from about 2,000 to about 50,000, in embodiments from about 3,000 to about 40,000, in embodiments from about 10,000 to about 30,000, and in embodiments from about 21,000 to about 24,000, as determined by GPC using polystyrene standards. The molecular weight distribution (Mw/Mn) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propy lene-adipate), copoly(5-sulfo-isophthaloyl)-copoly(buty lene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(penty lene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylene-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and combinations thereof.

The crystalline resin may be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and may be selected in an amount, for example, of from about 0.01 to about 1 mole percent of the resin. Additionally, in place of the organic diacid, an organic diester can also be selected, and where an alcohol byproduct is generated. In further embodiments, the crystalline polyester resin is a poly(dodecandioic acid-co-nonanediol).

Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxy benzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Suitable crystalline polyester resins include those disclosed in U.S. Pat. No. 7,329,476 and U.S. Patent Application Pub. Nos. 2006/0216626, 2008/0107990, 2008/

0236446 and 2009/0047593, each of which is hereby incorporated by reference herein in their entirety. In embodiments, a suitable crystalline resin may include a resin composed of ethylene glycol or nonanediol and a mixture of dodecanedioic acid and fumaric acid co-monomers with the following formula (II):

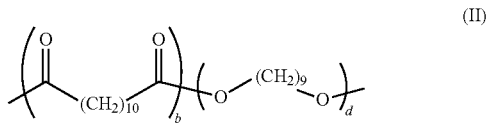

wherein b is from about 5 to about 2000, and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4,-oxy dibenzoate), poly(l0-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight (Mn), as measured by gel permeation chromatography (GPC) of, for example, from about 1,000 to about 10,000, in embodiments from about 2,000 to about 9,000, in embodiments from about 3,000 to about 8,000, and in embodiments from about 6,000 to about 7,000. The weight average molecular weight (Mw) of the resin is greater than 55,000, for example, from about 55,000 to about 150,000, in embodiments from about 60,000 to about 100,000, in embodiments from about 63,000 to about 94,000, and in embodiments from about 68,000 to about 85,000, as determined by GPC using polystyrene standard. The polydispersity index (PD) is above about 4, such as, for example, greater than about 4, in embodiments from about 4 to about 20, in embodiments from about 5 to about 10, and in embodiments from about 6 to about 8, as measured by GPC versus standard polystyrene reference resins. The PD index is the ratio of the weight-average molecular weight (Mw) and the number-average molecular weight (Mn). The low molecular weight amorphous polyester resins may have an acid value of from about 8 to about 20 mg KOH/g, in embodiments from about 9 to about 16 mg KOH/g, and in embodiments from about 11 to about 15 mg KOH/g. The high molecular weight amorphous polyester resins, which are available from a number of sources, can possess various melting points of, for example, from about 30° C. to about 140° C., in embodiments from about 75° C. to about 130° C., in embodiments from about 100° C. to about 125° C., and in embodiments from about 115° C. to about 121° C.

The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may be prepared by branching or cross-linking linear polyester resins. Branching agents can be utilized, such as trifunctional or multifunctional monomers, which agents usually increase the molecular weight and polydispersity of the polyester.

Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

Compositions containing modified polyester resins with a polybasic carboxylic acid which may be utilized in forming high molecular weight polyester resins include those disclosed in U.S. Pat. No. 3,681,106, as well as branched or cross-linked polyesters derived from polyvalent acids or alcohols as illustrated in U.S. Pat. Nos. 4,863,825; 4,863,824; 4,845,006; 5,143,809; 5,057,596; 4,988,794; 4,981,939; 4,980,448; 4,933,252; 4,931,370; 4,917,983, and 4,973,539, the disclosures of each of which are incorporated by reference herein in their entirety.

In embodiments, cross-linked polyesters resins may be made from linear amorphous polyester resins that contain sites of unsaturation that can react under free-radical conditions. Examples of such resins include those disclosed in U.S. Pat. Nos. 5,227,460; 5,376,494; 5,480,756; 5,500,324; 5,601,960; 5,629,121; 5,650,484; 5,750,909; 6,326,119; 6,358,657; 6,359,105; and 6,593,053, the disclosures of each of which are incorporated by reference herein in their entirety. In embodiments, suitable unsaturated polyester base resins may be prepared from diacids and/or anhydrides such as, for example, maleic anhydride, terephthalic acid, trimellitic acid, fumaric acid, and the like, and combinations thereof, and diols such as, for example, bisphenol-A ethylene oxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Such polyester resins may be formed from at least two pre-gel compositions including at least one polyol having two or more hydroxyl groups or esters thereof, at least one aliphatic or aromatic polyfunctional acid or ester thereof, or a mixture thereof having at least three functional groups; and optionally at least one long chain aliphatic carboxylic acid or ester thereof, or aromatic monocarboxylic acid or ester thereof, or mixtures thereof. The two components may be reacted to substantial completion in separate reactors to produce, in a first reactor, a first composition including a pre-gel having carboxyl end groups, and in a second reactor, a second composition including a pre-gel having hydroxyl end groups. The two compositions may then be mixed to create a cross-linked branched polyester high molecular weight resin. Examples of such polyesters and methods for their synthesis include those disclosed in U.S. Pat. No. 6,592,913, the disclosure of which is hereby incorporated by reference herein in its entirety.

Suitable polyols may contain from about 2 to about 100 carbon atoms and have at least two or more hydroxyl groups, or esters thereof. Polyols may include glycerol, pentaerythritol, polyglycol, polyglycerol, and the like, or mixtures thereof. The polyol may include a glycerol. Suitable esters of glycerol include glycerol palmitate, glycerol sebacate, glycerol adipate, triacetin tripropionin, and the like. The polyol may be present in an amount of from about 20% to about 30% by weight of the reaction mixture, in embodiments, from about 22% to about 26% by weight of the reaction mixture.

Aliphatic polyfunctional acids having at least two functional groups may include saturated and unsaturated acids containing from about 2 to about 100 carbon atoms, or esters thereof, in some embodiments, from about 4 to about 20 carbon atoms. Other aliphatic polyfunctional acids include malonic, succinic, tartaric, malic, citric, fumaric, glutaric, adipic, pimelic, sebacic, suberic, azelaic, sebacic, and the like, or mixtures thereof. Other aliphatic polyfunctional acids which may be utilized include dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid.

Aromatic polyfunctional acids having at least two functional groups which may be utilized include terephthalic, isophthalic, trimellitic, pyromellitic and naphthalene 1,4-, 2,3-, and 2,6-dicarboxylic acids.

The aliphatic polyfunctional acid or aromatic polyfunctional acid may be present in an amount of from about 40% to about 65% by weight of the reaction mixture, in embodiments, from about 44% to about 60% by weight of the reaction mixture.

Long chain aliphatic carboxylic acids or aromatic monocarboxylic acids may include those containing from about 12 to about 26 carbon atoms, or esters thereof, in embodiments, from about 14 to about 18 carbon atoms. Long chain aliphatic carboxylic acids may be saturated or unsaturated. Suitable saturated long chain aliphatic carboxylic acids may include lauric, myristic, palmitic, stearic, arachidic, cerotic, and the like, or combinations thereof. Suitable unsaturated long chain aliphatic carboxylic acids may include dodecylenic, palmitoleic, oleic, linoleic, linolenic, erucic, and the like, or combinations thereof. Aromatic monocarboxylic acids may include benzoic, naphthoic, and substituted naphthoic acids. Suitable substituted naphthoic acids may include naphthoic acids substituted with linear or branched alkyl groups containing from about 1 to about 6 carbon atoms such as 1-methyl-2 naphthoic acid and/or 2-isopropyl-1-naphthoic acid. The long chain aliphatic carboxylic acid or aromatic monocarboxylic acids may be present in an amount of from about 0% to about 70% weight of the reaction mixture, in embodiments, of from about 15% to about 30% weight of the reaction mixture.

Additional polyols, ionic species, oligomers, or derivatives thereof, may be used if desired. These additional glycols or polyols may be present in amounts of from about 0% to about 50% weight percent of the reaction mixture. Additional polyols or their derivatives thereof may include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate iso-butyrate and the like.

In embodiments, the cross-linked branched polyesters for the high molecular weight amorphous polyester resin may include those resulting from the reaction of dimethylterephthalate, 1,3-butanediol, 1,2-propanediol, and pentaerythritol.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in any core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8.

In embodiments, resins, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered. Thus, in embodiments, the toner particles herein comprise emulsion aggregation toner particles.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants include polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxytheylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPALR CA-210, IGEPALR CA-520, IGEPALR CA-720, IGEPAL R CO-890, IGEPALR CO-720, IGEPALR CO-290, IGEPALR CA-210, ANTAROXR 890 and ANTAROXR 897. An example of a suitable nonionic surfactant is ANTAROX® 897 available from Rhone-Poulenc Inc., which consists primarily of alkyl phenol ethoxylate. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be used include sulfates and sulfonates, sodium dodecylsulfate (SDS), sodium dodecyl benzene sulfonate, sodium dodecyl-naphthalene sulfate, dialkyl benzenealkyl sulfates and sulfonates, such as abietic acid, available from Aldrich, and the NEOGEN® brand of anionic surfactants. An example of a suitable anionic surfactant is NEOGEN® R, NEOGEN® RK, and NEOGEN® SC, available from Daiichi Kogyo Seiyaku co. Ltd., or TAYCA POWER BN2060 from Tayca Corporation (Japan), which consists primarily of branched sodium dodecyl benzene sulphonate. Other suitable anionic surfactants include, in embodiments, DOWFAX™ 2A1, an alkyldiphenyloxide disulfonate available from The Dow Chemical Company. Combinations of these surfactants may be used. Combinations of these surfactants and any of the foregoing anionic surfactants may be utilized in embodiments.

Examples of cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, salts halide of quaternized polyoxyethylalkylamines, dodecylbenzyl triethyl ammonium chloride, and mixtures thereof. Specific examples include MIRAPOLR and ALKAQUATR available from Alkaril Chemical Company, SANISOLR (benzalkonium chloride) available from Kao Chemicals, and the like. An example of a suitable cationic surfactant is SANISOLR B-50 available from Kao Corp., which consists primarily of benzyl dimethyl alkonium chloride. Mixtures of these and other surfactants may be utilized in embodiments.

The latex particles produced as described above may be added to a colorant to produce a toner. In embodiments the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

Exemplary colorants include carbon black like REGAL 330R) magnetites; Mobay magnetites including MO8029™, M08060™: Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™: Northern Pigments magnetites including, NP-604™, NP-608™: Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE I™ available from Paul Uhlich and Company, Inc.; PIGMENT VIOLET I™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33,2,5-dimethoxy-4-sulfonanilide phenylazo-4'-chloro-2,5-dimethoxy acetoacetanilide, Yellow 180, and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

In embodiments, toners of the present disclosure may have high pigment loadings. As used herein, high pigment loadings include, for example, toners having a colorant in an amount of from about 4 percent by weight of the toner to about 40 percent by weight of the toner, in embodiments from about 5 percent by weight of the toner to about 15 percent by weight of the toner. These high pigment loadings may be important for certain colors such as Magenta, Cyan, Black, PANTONER Orange, Process Blue, PANTONER yellow, and the like. (The PANTONER colors refer to one of the most popular color guides illustrating different colors, wherein each color is associated with a specific formulation of colorants, and is published by PANTONE, Inc., of Moonachie, NJ.) One issue with high pigment loading is that it may reduce the ability of the toner particles to spherodize, that is, to become circular, during the coalescence step, even at a very low pH.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX® T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes. The addition of the agent may also be done while the mixture is maintained under stirred conditions, in embodiments from about 50 rpm to about 1,000 rpm, in other embodiments from about 100 rpm to about 500 rpm, and at a temperature that is below the glass transition temperature of the resin as discussed above, in embodiments from about 30° C. to about 90° C., in embodiments from about 35° C. to about 70° C.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example free radical or thermal initiators such as organic peroxides and azo compounds described above as suitable for forming a gel in the core.

Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy) hexane, t-butyl cumyl peroxide, a-a-bis (t-butyl peroxy) diisopropyl benzene, di-t-butyl peroxide and 2,5-dimethyl 2,5di(t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy) valerate, 1,1-di(t-butyl peroxy)3,3,5-trimethyl cyclohexane, 1,1-di(t-butyl peroxy) cyclohexane, 1,1-di(t-amyl peroxy) cyclohexane, 2,2-di(t-butyl peroxy) butane, ethyl 3,3-di(t-butyl peroxy) butyrate and ethyl 3,3-di(t-amyl peroxy) butyrate, and combinations thereof. Examples of suitable azo compounds include 2,2,'-azobis(2,4-dimethylpentane nitrile), azobis-isobutyronitrile, 2,2,-azobis (isobutyronitrile), 2,2,-azobis(2,4-dimethyl valeronitrile), 2,2'-azobis(methyl butyronitrile), 1,1'-azobis(cyano cyclohexane), other similar known compounds, and combinations thereof.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

A single polyester resin may be utilized as the shell or, as noted above, in embodiments a first polyester resin may be combined with other resins to form a shell. Multiple resins may be utilized in any suitable amounts. In embodiments, a first amorphous polyester resin, for example a low molecular weight amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments a second resin, in embodiments a high molecular weight amorphous resin, may be present in the shell resin in an amount of from about 0 percent by weight to about 80 percent by weight of the total shell resin, in embodiments from about 10 percent by weight to about 70 percent by weight of the shell resin.

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 100 rpm to about 400 rpm, in embodiments from about 200 rpm to about 300 rpm. The fused particles can be measured for shape factor or circularity, such as with a SYSMEX FPIA 3000 analyzer, until the desired shape is achieved.

Coalescence may be accomplished over a period of time from about 0.01 to about 9 hours, in embodiments from about 0.1 to about 4 hours.

In embodiments, after aggregation and/or coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time of from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

Subsequently, the toner slurry may be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

In embodiments, toner particles may contain the organic polymeric particle additive composition of the present disclosure described above, as well as other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference herein in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN™ 700, and mixtures thereof. In embodiments, the toners herein further comprise cleaning additives selected from the group consisting of stearates, cerium oxide, strontium titanate, and combinations thereof.

In general, silica may be applied to the toner surface for toner flow, triboelectric charge enhancement, admix control, improved development and transfer stability, and higher toner blocking temperature. Titania may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

In embodiments, the toner further comprises a member of the group consisting of a silica surface additive, a titania surface additive, and combinations thereof. In embodiments, the toner comprises a silica additive, a titania additive, or a combination thereof, and at least one of the silica or titania additives has a hydrophobic treatment, in embodiments, one or more of the silica or titania additives has a polydimethylsiloxane hydrophobic treatment.

Each of these external additives may be present in an amount from about 0 weight percent to about 3 weight percent of the toner, in embodiments from about 0.25 weight percent to about 2.5 weight percent of the toner, although the amount of additives can be outside of these ranges. In embodiments, the toners may include, for example, from about 0 weight percent to about 3 weight percent titania, from about 0 weight percent to about 3 weight percent silica, and from about 0 weight percent to about 3 weight percent zinc stearate.

In embodiments, in addition to the polymeric additive of the present disclosure, toner particles may also possess silica in amounts of from about 0.1% to about 5% by weight of the toner particles, in embodiments from about 0.2% to about 2% by weight of the toner particles, and titania in amounts of from about 0% to about 3% by weight of the toner particles, in embodiments from about 0.1% to about 1% by weight of the toner particles.

In embodiments, the organic polymeric toner additive is present in the toner in an amount of from about 0.75 to about 1.5 percent by weight, based upon a total weight of the toner components. In certain embodiments, the copolymer toner additive is present in the toner in an amount of from about 0.75 to about 1.5 parts per hundred by weight, based on 100 parts by weight of the base toner particles; the toner further comprises a silica surface additive present in the toner in an amount of from about 1.7 to about 2.9 parts per hundred by weight, based on 100 parts by weight of the base toner particles; and the toner further comprises a titania additive present in the toner in an amount of from about 0.5 to about 1.1 parts per hundred by weight, based on 100 parts by weight of base toner particles; and wherein, optionally, in embodiments, at least one of the additives has a polydimethylsiloxane treatment.

In embodiments one or more of the silica or titania additives has a polydimethylsiloxane hydrophobic treatment. In embodiments, the total loading of the cross-linked polymeric toner additive and the silica loading is greater than or equal to 2.8 parts per hundred by weight of 100 parts by weight of base toner particles.

Suitable additives further include those disclosed in U.S. Pat. Nos. 3,590,000, and 6,214,507, the disclosures of each of which are hereby incorporated by reference in their entirety. Again, these additives may be applied simultaneously with the shell resin described above or after application of the shell resin.

In embodiments, toners of the present disclosure may be utilized as ultra-low melt (ULM) toners. In embodiments, the dry toner particles having a core and/or shell may, exclusive of external surface additives, have one or more the following characteristics:

(1) Volume average diameter (also referred to as "volume average particle diameter") of from about 3 to about 25 micrometers (μm), in embodiments from about 4 to about 15 μm, in other embodiments from about 5 to about 12 μm.

(2) Number Average Geometric Size Distribution (GSDn) and/or Volume Average Geometric Size Distribution (GSDv): In embodiments, the toner particles described in (1) above may have a narrow particle size distribution with a lower number ratio GSD of from about 1.15 to about 1.38, in other embodiments, less than about 1.31. The toner particles of the present disclosure may also have a size such that the upper GSD by volume in the range of from about 1.20 to about 3.20, in other embodiments, from about 1.26 to about 3.11. Volume average particle diameter D50V, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

(3) Shape factor of from about 105 to about 170, in embodiments, from about 110 to about 160, SF1*a. Scanning electron microscopy (SEM) may be used to determine the shape factor analysis of the toners by SEM and image analysis (IA). The average particle shapes are quantified by employing the following shape factor (SF1*a) formula:

$$SF1^*a = 100 \pi d^2/(4A),$$

where A is the area of the particle and d is its major axis. A perfectly circular or spherical particle has a shape factor of exactly 100. The shape factor SF1*a increases as the shape becomes more irregular or elongated in shape with a higher surface area.

(4) Circularity of from about 0.92 to about 0.99, in other embodiments, from about 0.94 to about 0.975. The instrument used to measure particle circularity may be an FPIA-3000 manufactured by SYSMEX, following the manufacturer's instructions.

The characteristics of the toner particles may be determined by any suitable technique and apparatus and are not limited to the instruments and techniques indicated hereinabove.

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 µm in size, in embodiments from about 50 to about 75 µm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

The toners can be utilized for electrostatographic or electrophotographic processes. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 160° C. or less, in embodiments from about 70° C. to about 160° C., in other embodiments from about 80° C. to about 140° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Comparative Example 1

Organic additive latex of 98 nm particle size having 74.2% CHMA, 25% DVB, 0.8% DMAEMA.

In a 300 gallon reactor equipped with two P4 type impellers and a condenser, 0.942 kg of sodium lauryl sulfate (SLS) surfactant (at 30% solids) n was added to 444 kg deionized water (DIW). The reactor was deoxygenated by passing a stream of nitrogen through it during the reaction, as well, a condenser was used. The reactor was ramped to 77° C. and the revolutions per minute (rpm) was set to 59. Separately, in a 100 gallon reactor, equipped with one P4 type impeller, a monomer emulsion was prepared by mixing (at 28 rpm) 126 kg cyclohexylmethacrylate (CHMA), 42.45 kg divinylbenzene (DVB), 1.358 kg dimethyl-amino-ethyl-methacrylate (DMAEMA), 5.92 kg SLS surfactant (at 30% solids), and 221.1 kg DIW together. A 0.369 kg of seed was taken from the monomer emulsion and pumped into the 300 gallon reactor at 77° C. An initiator solution prepared from 0.645 kg of ammonium persulfate in 7.045 kg of DIW was added over 15 minutes after the seed emulsion addition. The remaining monomer emulsion was fed into the 300 gallon reactor over 120 minutes. Once half of the monomer emulsion was added, the rpm in the reactor was increased to 66 rpm. At the end of the monomer feed, the condenser was turned off. The latex was treated to a post-processing protocol of 1 hour at 77° C. followed by a 2 hour ramp to 87° C. and a 1 hour hold at 87° C. to reduce residual monomer at the end of the emulsion polymerization step. During the post-processing protocol, the latex was also pH adjusted to ≥6.0 every 30 minutes with a 0.1 weight percent solution of NaOH. The resultant latex containing 20 percent solids with a particle size of 98 nanometers (nm) was filtered through a 25 micron filter bag and spray dried.

Comparative Example 2

A silicone polyether, also known as dimethicone polyols in the personal care industry, from Siltech Corporation, was used.

In embodiments, the silicone-polyether copolymer contains a polysiloxane (also known as silicone) unit and a polyether unit.

The polysiloxane unit may have the formula (III):

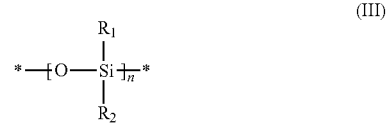

(III)

wherein each $R_1$ may be independently H, or an alkyl group; wherein each $R_2$ may be independently an alkyl group; wherein n is from 2 to 1300, or from 5 to 500, or from 10 to 300. In embodiments, each one of $R_1$ and $R_2$ may be methyl (i.e., the polysiloxane unit is dimethicone, which is also known as polydimethylsiloxane (PDMS)). When each one of $R_1$ and $R_2$ are methyl, Formula (III) may be referred to as polydimethylsiloxane or dimethylpolysiloxane. The term "alkyl" is intended to include branched, straight chain and cyclic, substituted or unsubstituted saturated aliphatic hydrocarbon groups. Alkyl groups can comprise about 1 to about 24 carbon atoms ("C1-C24"), about 7 to about 24 carbon atoms ("C7-C24"), about 8 to about 24 carbon atoms ("C8-C24"), or about 9 to about 24 carbon atoms ("C9-C24"). Alkyl groups can also comprise about 1 to about 8 carbon atoms ("C1-C8"), about 1 to about 6 carbon atoms ("C1-C6"), or about 1 to about 3 carbon atoms ("C1-C3"). Examples of C1-C6 alkyl groups include, but are not limited to, methyl, ethyl, propyl, isopropyl, n-butyl, isobutyl, tert-butyl, n-pentyl, neopentyl and n-hexyl radicals.

The polyether unit may contain more than one ether group represented by the formula $(C_nH_{2n}O)_k$, wherein n is an integer of from 1 to about 5, k is a number of the repeating units ranging from about 2 to about 300. In specific embodiments, the polyether unit may be $(OCH_2CH_2)_k$. In specific embodiments, the polyether may also include a branched repeat unit, $(OCH_2CH_2CH_2)_k$. In embodiments, the polyether unit may be selected from the group consisting of a poly(ethylene oxide), a poly(propylene oxide), and a copolymer of poly(ethylene oxide), poly(propylene oxide), and mixtures thereof.

In embodiments, the silicone-polyether copolymer may have the formula (IV):

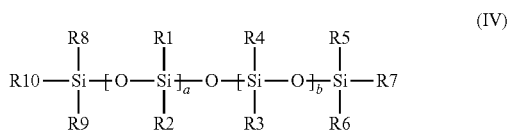

wherein each of $R_1$ to $R_{10}$ vary independently. $R_1$ may be H, or an alkyl group; $R_2$ may be alkyl; each of $R_3$, $R_5$ and $R_8$ independently may be H, alkyl, $-(CH_2)_3-O-(CH_2CH_2O)_c-(CH_2(CH_3)CHO)_d-H$, $-(CH_2)_3-O-(CH_2CH_2O)_c-(CH_2(CH_3)CHO)_d-(CH_2CH_2O)_e-H$, $-(CH_2CH_2O)_f-H$, $-(C_nH_{2n})-(C_mH_{2m}O)_c-(C_pH_{2p}O)_d-H$; R4 is $-(CH_2)_3-O-(CH_2CH_2O)_c-(CH_2(CH_3)CHO)_d-$ H, $-(CH_2)_3-O-(CH_2CH_2O)_c-(CH_2(CH_3)CHO)_d-(CH_2CH_2O)_e-H$, $-(CH_2CH_2O)-(CH_2CH_2O)_f-H$, or $-(C_nH_{2n})-(C_mH_{2m}O)_c-(C_pH_{2p}O)_d-H$; each of $R_6$, $R_7$, $R_9$ and $R_{10}$ independently may be alkyl, $-(CH_2)_3-O-(CH_2CH_2O)_c-(CH_2(CH_3)CHO)_d-H$, $-(CH_2)_3-O-(CH_2CH_2O)_c-(CH_2(CH_3)CHO)_d-(CH_2CH_2O)_e-H$, $-(CH_2CH_2O)-(CH_2CH_2O)_f-H$, or $-(C_nH_{2n})-(C_mH_{2m}O)_c-(C_pH_{2p}O)_d-H$; wherein a may be from 0 to 1000; b may be from 0 to 300; each of c, d, and e may be independently selected from 0 to 300; f may be from 1 to 300; each of n, m and p may be independently integers of from 2 to 5.

The amount of silicon atom present in the silicone-polyether copolymer is from about 0.5% to about 5%, from about 0.6% to about 4%, or from about 0.7% to about 3%, as determined by XPS spectroscopy.

In embodiments, the silicone-polyether copolymer may include a linear block copolymer in which the polyether unit is bound to the terminal end of a polysiloxane unit, a grafted copolymer in which the polyether unit is bound to the polysiloxane unit as a pendent group, or a copolymer comprising a mixture thereof. The term "block copolymers" encompasses within its scope two or more different units (any two or more units selected from the polysiloxane unit and/or the polyether unit) which are linked to form a single polymer molecule. The block copolymers are in the form of di-, tri- and multi-block polymers. The term "polymer block" refers to one of the blocks of the block copolymer.

In embodiments, the polyether unit may be selected from the group consisting of a poly(ethylene oxide), a poly (propylene oxide), a copolymer of poly(ethylene oxide) and poly(propylene oxide), and mixtures thereof.

In embodiments, the silicone polyether copolymer may have at least one carbinol functional group. As described herein, the term "carbinol" refers to a hydroxyl group bound to carbon atom (C—OH).

In embodiments, the silicone-polyether copolymer may have an average molecular weight ranging from about 100 to about 100,000, from about 400 to about 40,000, from about 2,000 to about 30,000.

In embodiments, the silicone-polyether copolymer may have a viscosity (cps) of from about 50 to about 100000, from about 100 to about 30000, or from about 200 to about 5000.

In embodiments, the silicone-polyether copolymer may include formulae (V), (VI), and the like, and mixtures thereof. Formulae (V) and (VI) are shown below:

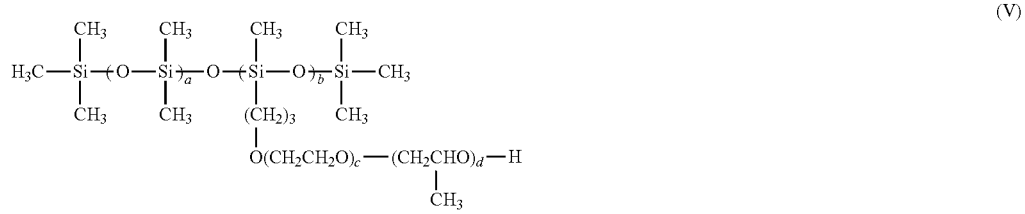

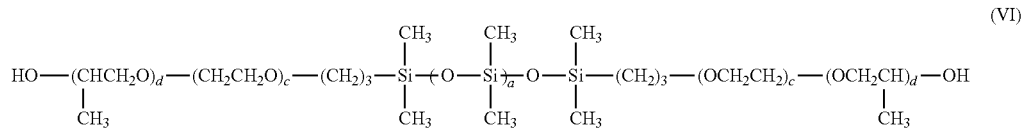

wherein each a is independently from about 1 to about 1000, each b is independently from about 1 to about 300, each c is independently from about 1 to about 300, each d is independently from about 0 to about 300, further wherein the average molecular weights of the silicone-polyether copolymer is from about 300 to about 100,000. The average molecular weight of these copolymers may range from about 300 to about 30,000, or from about 500 to about 15,000.

In embodiments, the silicone polyether copolymer is water soluble. In embodiments, the silicone polyether copolymer is water dispersible.

Some examples of silicone polyether copolymer include, but are not limited to, PEG-12 dimethicone (an ethoxylated polydimethylsiloxane modified with polyethylene glycol of average chain length of 12 units) as Silsurf® D212-CG, PEG-10 Dimethicone (a silicone glycol copolymer modified with polyethylene glycol of average chain length of 10 units) as Silsurf® C410, PEG/PPG-18/18 Dimethicone, (a silicone glycol polyether, where the silicone is modified with polyethylene glycol of average chain length of 18 units and polypropylene glycol of average chain length of 18 units with a viscosity of 2,000 centipoise (cps) and a molecular weight of 27,000), as Silsurf® J1015-O.

In embodiments, the silicone polyether copolymer may be present in the polymeric composition in an amount of from about 0.1% to about 3% by weight, such as in an amount of from about 0.2% to about 2% by weight, from about 0.3% to about 1.8%, or from about 0.4% to about 1.5% by weight of the polymeric composition.

In embodiments, the silicone polyether copolymer may cover from about 5% to about 100%, from about 10% to about 99%, or from about 30% to about 90% of the surface area of the polymeric additive.

To prepare the treated organic additive latex, 500 grams of organic additive latex prepared as in Comparative Example 1, having 74.2% CHMA, 25% DVB, 0.8%, DMAEMA, a particle size of 100 nm, and a total residual monomer of 200 parts per million (ppm) was weight using a Mettler Toledo PB3002-S lab scale. To the latex, a pre-calculated mass of the silicone polyether lubricant was added using a transfer pipette while mixing with a magnet stirrer for at least 15 minutes. The amount used was 2 weight percent of the silicone polyether (Silsurf® J1015-O).

Comparative Example 3

Organic additive with 1% PDMS oil. In a 2 L buchi reactor, equipped with two HE3 type impellers, 3.75 grams of SLS surfactant (at 30% solids) was added to 816 grams DIW. The reactor was deoxygenated by passing a stream of nitrogen through it during the reaction. The reactor was ramped to 77° C. and the rpm was set to 350. Separately, a 1L glass vessel equipped with two P4 impellers, a monomer emulsion was prepared by mixing (at 450 rpm) 3.17 grams polydimethylsiloxane (PDMS) (20 centiStoke (cSt) oil), 237 grams CHMA, 80 grams DVB, 2.58 grams DMAEMA, 9.18 grams SLS surfactant (at 30% solids), and 416 grams DIW together. 37.4 grams of seed was taken from the monomer emulsion and pumped into the 2 L reactor at 77° C. An initiator solution prepared from 1.22 grams of ammonium persulfate in 34.3 grams of DIW was added over 20 minutes after the seed emulsion addition. The remaining monomer emulsion was fed into the reactor over 120 minutes. Once half the monomer emulsion was added, the rpm in the reactor was increased to 450 rpm. At the end of the monomer feed, the latex was treated to a post-processing protocol of 1 hour at 77° C. followed by a 2 hour ramp to 87° C. and a 2 hour hold at 87° C. to reduce residual monomer at the end of the emulsion polymerization step. As well, the reactor rpm was further increased to 530. The resultant latex containing 16.3% solids with a particle size of 87 nm was obtained and spray dried.

Comparative Example 4

Organic additive with 1% PDMS. The Comparative Example 3 was repeated except 50 cSt PDMS oil was used at 1%. The final spray dried latex was 87 nm.

Example 1

Organic additive latex with 1% PDMS with vinyl termination. In a 2 L buchi reactor equipped with two HE3 type impellers, 3.75 grams of SLS surfactant (at 30% solids) was added to 816 grams DIW. The reactor was deoxygenated by passing a stream of nitrogen through it during the reaction. The reactor was ramped to 77° C. and the rpm was set to 350. Separately, in a 1L glass vessel, equipped with two P4 impellers, a monomer emulsion was prepared by mixing (at 450 rpm) 3.17 grams poly(dimethylsiloxane)-vinyl terminated (purchased from Sigma, CAS #68083-19-2, structure below), 237 grams CHMA, 80 grams DVB, 3.58 grams DMAEMA, 9.18 grams SLS surfactant (at 30% solids) and 416 grams DIW together. 37.4 grams of seed was taken from the monomer emulsion and pumped into the 2 L reactor at 77° C. An initiator solution prepared from 1.22 grams of ammonium persulfate in 34.3 grams of DIW was added over 20 minutes after the seed emulsion addition. The remaining monomer emulsion was fed into the reactor over 120 minutes. Once half the monomer emulsion was added, the rpm in the reactor was increased to 450 rpm. At the end of the monomer feed, the latex was treated to a post processing protocol of 1 hour at 77° C. followed by a 2 hour ramp to 87° C. and a 2 hour hold at 87° C. to reduce residual monomer at the end of the emulsion polymerization step. As well, the reactor rpm was further increased to 530. The resultant latex containing 15.6% solids with a particle size of 88 nm was obtained. The poly(dimethylsiloxane)-vinyl terminated is of the structure (VII):

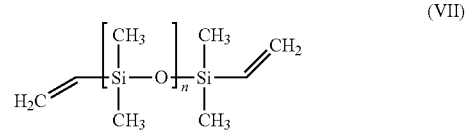

(VII)

wherein n is wherein n is from 2 to 1300, or from 5 to 500, or from 10 to 300, further wherein the average molecular weights of the silicone-polyether copolymer is from about 100 to about 100,000. The average molecular weight of these copolymers may range from about 300 to about 30,000, or from about 500 to about 15,000.

Evaluation.

All additives were 10-L Henschel blended in an additive package as show in Table 1 with Xerox® 700 toner (CY1417) including the same parent reference toner. For the organic additive Example 1 and Comparative Examples 1-4, 1.05 parts per hundred (pph) (pph based on weight of toner particles) of the organic additive replaced sol-gel silica. Xerox® 700 Digital Color Press parent cyan Eco toner was blended in a 10-L Henschel using standard conditions with surface additives at 100% SAC (surface area coverage) of the toner particles, correcting for particle size and density of each additive. The general ideal formula for the % surface area coverage of spherical organic surface additive on a toner particle surface is given by (100%−w·D·P)/(0.363·d·p), where for the toner D is the D50 average size in microns and P is the true density in grams/cm³, and for the organic emulsion polymerized latex, d is the D50 average size in nanometers, p is the true density in grams/cm³, and w is the weight added to the mixture in pph.

TABLE 1

| Control Additive Package | Organic Additive Package |
|---|---|
| 2.3 pph RY50L | 2.3 pph RY50L |
| 0.8 pph JMT2000 | 0.8 pph JMT2000 |
| 0.14 pph strontium titanate (ST-A) | 0.14 pph ST-A |
| 0.09 pph zinc stearate (ZnFP) | 0.09 pph 3333ZnFP |
| 1.4 pph X24 | 1.05 pph Organic Additive of Example 1 |

RY50L is a 40 nanometer PDMS treated silica available from Wacker.

JMT2000 is a 15 nanometer treated titanium dioxide available from Tayca Corporation.

ST-A is a strontium titanium oxide available from Konishiyasu Company.

ZnFP is zinc stearate available from Fuji Business Innovation.

X24 is a sol-gel silica additive available from ShinEtsu.

Bench Testing.

Compared to the Comparative Example 1, the Example 1 toner had the same J-Zone (Low humidity 21° C. and 10% relative humidity) charge per mass ratio (Q/M), which charge to diameter ratio (Q/D) as well as A-Zone (High humidity 28° C. and 85% relative humidity), were slightly increased. Higher Q/D improves background latitude, but has little effect on development, which depends on Q/M. While higher Q/M in A-Zone might affect development a little, the expected improved background latitude is more important in A-Zone, where background is always more of a concern. The relative humidity (RH) ratio is equal for Q/M, to a little better in Q/D for Example 1. Also, the 7 day charge maintenance is improved for Example 1, even more than usually seen for organic additive designs.

Surprisingly, blocking was improved significantly, by 1.5° C. Cohesion was similar or perhaps slightly better, and actually just at the upper end of the typical cohesion range.

Overall, Example 1 performance is improved over Comparative Example 1. And compared to the same parent reference with X24 sol-gel silica additive, there is no performance concern.

Machine Testing in A-Zone.

Evaluation was done to measure print quality of the toners with respect to the spots on the print, which are caused by a blade cleaning failure of the photoreceptor. Toners were printed under A-Zone conditions in a Xerox® 700 printer. The cyan toners were tested in the cyan housing. The cyan station contains a bias charging roller (BCR) to charge the photoreceptor, which is the stress for spots. The test protocol is shown in Table 3. For each toner, first 2,000 prints were made a high 20% print area coverage of toner to changeover from the toner that was in the printer. A further 1,000 prints of 20% print area coverage were then made. Printing was stopped and at this checkpoint, CP2, a print with a printed 100% solid toner patch of size 80 millimeters (mm) by 80 mm was examined. The print run continued to CP3, CP4, and CP5, at a low area coverage of 0.4%, which is very stressful for poor cleaning. At each of these CPs, the visible spots in the patch were counted as enumerated and shown in Table 4. Also, at each of CP2, CP3, CP4, and CP5, the Q/M charge and toner concentration (TC) of the developer in the developer housing was measured. These values are also tabulated in Table 4. Compared to the production toner, the Comparative Examples 3 and 4 showed considerably lower TC and also tended to show low charge as the toner aged. Lower charge in A-Zone is not desirable. In contrast, the toner from Example 1 showed much better TC, much closer to the control. In general, small scale blends do tend to show a little lower TC than production blends, so this difference is not a concern. The Q/M charge of Example 1 in A-zone tends to be somewhat higher, at least initially than the control, and at high toner age remains slightly above the control. This is a much more desirable situation than the Comparative Examples. Aside from somewhat worse spots than the same parent reference, there were no serious concerns about Example 1 machine performance from the data collected to date.

TABLE 3

| | Printing Conditions | | |
|---|---|---|---|
| Check Point | Area Coverage (%) | Prints In Segment | Total Prints |
| CP1 | 20 | 2000 | 2000 |
| CP2 | 20 | 1000 | 3000 |
| CP3 | 0.4 | 1878 | 4878 |
| CP4 | 0.4 | 2312 | 7190 |

TABLE 2

| Example | A-Zone Q/d | A-Zone Q/m | J-Zone Q/d | J-Zone Q/m | RH Q/d | RH Q/m | 24 Hour CM | 7 Day CM | Blocking Onset (° C.) | Cohesion (%) |
|---|---|---|---|---|---|---|---|---|---|---|
| Same Parent Reference (1.4% X24/CY1417) | 5.8 | 36 | 10.4 | 56 | 0.55 | 0.64 | 88 | 72 | 51.3 | 14 |
| Comparative Example 1 | 5.8 | 33 | 10.4 | 59 | 0.55 | 0.56 | 95 | 83 | 50.0 | 41 |
| Example 1 | 7.2 | 36 | 13.1 | 59 | 0.55 | 0.61 | 95 | 92 | 51.5 | 36 |

TABLE 4

|  | Xerox ® 700 Cyan | Same Parent Reference | Comp. Ex. 1 | Comp. Ex. 2 | Comp. Ex. 3 | Comp. Ex. 4 | Ex. 1 |
|---|---|---|---|---|---|---|---|
| CP2 spots | 0 | 0 | 0 | 0 | 0 | 0 | 0 |
| CP3 spots | 0 | 0 | 44 | 330 | 280 | 121 | 16 |
| CP4 spots | 0 | 12 | 121 | 199 | 260 | 294 | 15 |
| CP5 spots | 0 | 65 | 30 |  | 364 | 233 | 104 |
| Total spots | 0 | 77 | 195 | 529 | 904 | 648 | 125 |
| CP2 % TC | 10.6 | No data | No data | No data | 7.3 | 6.5 | 8.5 |
| CP3 % TC | 9.3 | No data | No data | No data | 7.1 | 7.9 | 9.0 |
| CP4 % TC | 10.2 | No data | No data | No data | 7.8 | 7.5 | 9.0 |
| CP5 % TC | 11.4 | No data | No data | No data | 7.7 | 8.1 | 9.4 |
| CP2 Q/M | 21 | No data | No data | No data | 28 | 32 | 36 |
| CP2 Q/M | 28 | No data | No data | No data | 26 | 25 | 34 |
| CP2 Q/M | 27 | No data | No data | No data | 23 | 24 | 32 |
| CP2 Q/M | 26 | No data | No data | No data | 23 | 22 | 31 |

The Xerox R 700 toner showed no spots as a reference point. Using the same parent toner as the examples and comparative examples, but with X24 sol-gel silica instead of an organic additive, there were 77 spots total. Comparative Example 1 with untreated organic additive showed 195 pots, worse than the same parent reference. The organic additive with a silicone polyether treatment of Comparative Example 2, and the organic additive treated with PDMS oils in Comparative Examples 3 and 4 all showed worse spots. While not wishing to be bound or limited by theory, it is believed that the adsorbed PDMS freely transfers to the PR and the blade, in this case leading to over-lubrication of the blade/photoreceptor interface. Not only was the vinyl PDMS copolymer of Example 1 much better than the samples with adsorbed siloxanes, it was substantially improved compared to the untreated organic additive of Comparative Example 1, though not quite to the level of the X24 sol-gel silica control. We believe that the improvement is due to the fact that the PDMS is now bound to the latex and thus provides lower surface energy for the organic additive latex, without increasing the PR lubrication, as is the case when there is free siloxane.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An organic polymeric particle consisting of:
   an optional first monomer comprising a hydrophobic monomer;
   a second monomer comprising two or more vinyl groups;
   an optional third monomer comprising an amine; and
   a vinyl siloxane polymerizable monomer, wherein the vinyl siloxane polymerizable monomer is vinyl terminated silicone-polyether.

2. The organic polymeric particle of claim 1, wherein the first monomer comprising a hydrophobic monomer is present, and wherein the first monomer comprises a non-fluorinated hydrophobic monomer having a high carbon to oxygen ratio of from about 3 to about 8 or a fluorinated monomer.

3. The organic polymeric particle of claim 1, wherein the first monomer comprising a hydrophobic monomer is present, and wherein the first monomer comprises an acrylate, a methacrylate, or a cyclohexylmethacrylate.

4. The organic polymeric particle of claim 1, wherein the first monomer comprising a hydrophobic monomer comprises an aliphatic cycloacrylate selected from a member of the group consisting of cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, and combinations thereof.

5. The organic polymeric particle of claim 1, wherein the first monomer comprising a hydrophobic monomer comprises a fluorinated acrylate.

6. The organic polymeric particle of claim 1, wherein the first monomer comprises trifluoroethylmethacrylate.

7. The organic polymeric particle of claim 1, wherein the second monomer is selected from a member of the group consisting of diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2',-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2',-bis(4-(methacryloxy/diethoxy)phenyl)propane, 2,2',-bis(4-(methacryloxy/polyethoxy)phenyl)propane, trimethylolpropane trimethacrylate, tetramethylolmethane tetramethacrylate, divinyl benzene, divinyl naphthalene, divinyl ether, and combinations thereof.

8. The organic polymeric particle of claim 1, wherein the second monomer is divinyl benzene.

9. The organic polymeric particle of claim 1, wherein the optional third monomer is present, and wherein the third monomer is selected from a member of the group consisting of dimethylaminoethyl methacrylate, diethylaminoethyl methacrylate, dipropylaminoethyl methacrylate, diisopropylaminoethyl methacrylate, dibutylaminoethyl methacrylate, and combinations thereof.

10. The organic polymeric particle of claim 1, wherein the hydrophobic monomer is cyclohexyl methacrylate; and wherein the second monomer is divinyl benzene; and wherein the third monomer is dimethylaminoethyl methacrylate.

11. A toner composition comprising:
   at least one resin, an optional colorant, an optional wax, and an organic polymeric particle toner additive on at least a portion of an external surface of the toner particles, the particulate organic polymeric particle toner additive consisting of:
   an optional first monomer comprising a hydrophobic monomer;
   a second monomer comprising two or more vinyl groups;
   an optional third monomer comprising an amine; and
   a vinyl siloxane polymerizable monomer, wherein the vinyl siloxane polymerizable monomer is vinyl terminated silicone-polyether.

12. The toner composition of claim 11, wherein the first monomer of the particulate organic polymeric particle toner additive comprising a hydrophobic monomer is present, and wherein the first monomer comprises a non-fluorinated hydrophobic monomer having a high carbon to oxygen ratio of from about 3 to about 8 or a fluorinated monomer.

13. The toner composition of claim 11, wherein the first monomer of the particulate organic polymeric particle toner additive comprising a hydrophobic monomer is present, and wherein the first monomer comprises an acrylate, a methacrylate, or a cyclohexylmethacrylate.

14. The toner composition of claim 11, wherein the first monomer of the particulate organic polymeric particle toner additive comprising a hydrophobic monomer comprises an aliphatic cycloacrylate selected from the group consisting of cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, and combinations thereof.

15. The toner composition of claim 11, wherein the second monomer of the particulate organic polymeric particle toner additive is divinyl benzene.

16. The toner composition of claim 11, wherein the optional third monomer of the particulate organic polymeric particle toner additive is present, and wherein the third monomer is selected from a member of the group consisting of dimethylaminoethyl methacrylate, diethylaminoethyl methacrylate, dipropylaminoethyl methacrylate, diisopropylaminoethyl methacrylate, dibutylaminoethyl methacrylate, and combinations thereof.

17. The toner composition of claim 11, wherein the hydrophobic monomer of the particulate organic polymeric particle toner additive is cyclohexyl methacrylate; and wherein the second monomer of the particulate organic polymeric particle toner additive is divinyl benzene; and wherein the third monomer of the particulate organic polymeric particle toner additive is dimethylaminoethyl methacrylate.

18. A developer comprising:
   a toner composition, and a toner carrier;
   wherein the toner composition comprises:
   toner particles comprising at least one resin, an optional colorant, an optional wax, and an organic polymeric particle toner additive on at least a portion of an external surface of the toner particles, the organic polymeric particle toner additive consisting of:
   an optional first monomer comprising a hydrophobic monomer;
   a second monomer comprising two or more vinyl groups;
   an optional third monomer comprising an amine; and
   a vinyl siloxane polymerizable monomer, wherein the vinyl siloxane polymerizable monomer is vinyl terminated silicone-polyether.

19. The toner composition of claim 11, wherein the vinyl siloxane polymerizable monomer comprises 1% polydimethylsiloxane with vinyl termination.

* * * * *